United States Patent
Yang

(10) Patent No.: US 11,966,018 B2
(45) Date of Patent: Apr. 23, 2024

(54) CAMERA OPTICAL LENS

(71) Applicant: Raytech Optical (Changzhou) Co., Ltd, Changzhou (CN)

(72) Inventor: Yongqiang Yang, Shenzhen (CN)

(73) Assignee: Raytech Optical (Changzhou) Co., Ltd, Changzhou (CN)

( * ) Notice: Subject to any disclaimer, the term of this patent is extended or adjusted under 35 U.S.C. 154(b) by 638 days.

(21) Appl. No.: 17/134,523

(22) Filed: Dec. 28, 2020

(65) Prior Publication Data

US 2022/0082798 A1 Mar. 17, 2022

(30) Foreign Application Priority Data

Sep. 15, 2020 (CN) .......................... 202010964453.1

(51) Int. Cl.
*G02B 13/06* (2006.01)
*G02B 9/64* (2006.01)
*G02B 13/00* (2006.01)

(52) U.S. Cl.
CPC ........... *G02B 13/0045* (2013.01); *G02B 9/64* (2013.01); *G02B 13/06* (2013.01)

(58) Field of Classification Search
CPC ....... G02B 13/06; G02B 13/0045; G02B 9/64
See application file for complete search history.

(56) References Cited

U.S. PATENT DOCUMENTS 11,867,881 B2 * 1/2024 Chen .................. G02B 9/64
2010/0232038 A1 * 9/2010 Kang ................. G02B 13/16
359/728

(Continued)

FOREIGN PATENT DOCUMENTS

CN 207764460 U * 8/2018
CN 109143536 A * 1/2019

(Continued)

OTHER PUBLICATIONS

Max Born and Emil Wolf, Principles of Optics, 4th Edition, (Pergamon Press 1970), pp. 161-164). (Year: 1970).*

(Continued)

*Primary Examiner* — Ephrem Z Mebrahtu
*Assistant Examiner* — Wesley Scott Ashton
(74) *Attorney, Agent, or Firm* — W&G Law Group

(57) ABSTRACT

Provided is a camera optical lens, including, from object side to image side, a first lens having positive refractive power; a second lens having positive refractive power; a third lens having positive refractive power; a fourth lens having negative refractive power; a fifth lens having positive refractive power; a sixth lens; a seventh lens having positive refractive power; an eighth lens having negative refractive power; and a ninth lens having negative refractive power. The camera optical lens satisfies 2.00≤f1/f≤3.50 and 2.00≤d5/d6≤9.00, where f denotes a focal length of the camera optical lens, f1 denotes a focal length of the first lens, d5 denotes an on-axis thickness of the third lens, and d6 denotes an on-axis distance from an image side surface of the third lens to an object side surface of the fourth lens. The lens has large aperture, wide angle and ultra-thinness while having good optical performance.

10 Claims, 9 Drawing Sheets

(56) References Cited

U.S. PATENT DOCUMENTS

| | | | |
|---|---|---|---|
| 2015/0103413 A1* | 4/2015 | Uchida | G02B 13/18 |
| | | | 359/694 |
| 2020/0209594 A1* | 7/2020 | Hirano | G02B 9/64 |
| 2020/0241243 A1* | 7/2020 | Hirano | G02B 9/64 |
| 2020/0249437 A1* | 8/2020 | Hirano | G02B 13/0045 |
| 2020/0285028 A1* | 9/2020 | Hirano | H04N 23/55 |
| 2020/0393652 A1* | 12/2020 | Kuo | G02B 9/64 |
| 2020/0393653 A1* | 12/2020 | Chen | G02B 13/0045 |
| 2021/0011256 A1* | 1/2021 | Muratani | G02B 5/005 |
| 2021/0396955 A1* | 12/2021 | Okano | G02B 13/0045 |
| 2022/0075153 A1* | 3/2022 | Sun | G02B 9/64 |
| 2022/0075158 A1* | 3/2022 | Zhao | G02B 13/0045 |

FOREIGN PATENT DOCUMENTS

| | | | | |
|---|---|---|---|---|
| CN | 111427134 A | * | 7/2020 | |
| JP | 1988104011 A | * | 5/1988 | |
| JP | 2003270529 A | * | 9/2003 | |

OTHER PUBLICATIONS

Libin Sun et al., Lens Factory: Automatic Lens Generation Using Off-the-shelf Components, 2015, pp. 1-12 [online], [retrieved Aug. 22, 2023], retrieved from the Internet <URL: https://arxiv.org/pdf/1506.08956.pdf>. (Year: 2015).*

* cited by examiner

CAMERA OPTICAL LENS

TECHNICAL FIELD

The present invention relates to the field of optical lenses, and in particular, to a camera optical lens applicable to portable terminal devices such as smart phones and digital cameras, as well as camera devices such as monitors and PC lenses.

BACKGROUND

In recent years, with the rise of smart phones, the demand for miniaturized camera lenses has been increased. However, a photosensitive device of a conventional camera lens is either a Charge Coupled Device (CCD) or a Complementary Metal-Oxide Semiconductor Sensor (CMOS Sensor). With advancement of the semiconductor manufacturing technology, the pixel size of the photosensitive device is reduced. In addition, electronic products at present are developed to have better functions and a lighter and thinner configuration. Therefore, a miniaturized camera lens with better imaging quality has already become a mainstream in the current market.

In order to obtain better imaging quality, a traditional lens provided in a mobile phone camera usually adopts a three-lens or four-lens structure, or even five-lens or six-lens structure. However, with the development of technologies and the increase in users' diversified demands, a nine-lens structure gradually appears in lens design as the pixel area of the photosensitive device is constantly reduced and the system's requirements on imaging quality is constantly increased. However, in the conventional nine-lens structure, there is still certain irrationality in terms of refractive power, spacing between lenses, and a shape of the lens, resulting in insufficient ultra-thinness and insufficient wide angle of the lens.

SUMMARY

In view of the above problems, an objective of the present invention is to provide a camera optical lens that meets design requirements of a large aperture, ultra-thinness, and a wide angle while having good optical performance.

In order to solve the above technical problems, an embodiment of the present invention provides a camera optical lens. The camera optical lens includes from an object side to an image side: a first lens having positive refractive power; a second lens having positive refractive power; a third lens having positive refractive power; a fourth lens having negative refractive power; a fifth lens having positive refractive power; a sixth lens; a seventh lens having positive refractive power; an eighth lens having negative refractive power; and a ninth lens having negative refractive power. The camera optical lens satisfies: $2.00 \leq f1/f \leq 3.50$; and $2.00 \leq d5/d6 \leq 9.00$, where f denotes a focal length of the camera optical lens, f1 denotes a focal length of the first lens, d5 denotes an on-axis thickness of the third lens, and d6 denotes an on-axis distance from an image side surface of the third lens to an object side surface of the fourth lens.

As an improvement, the camera optical lens further satisfies: $-12.00 \leq f8/f7 \leq -2.50$, where f7 denotes a focal length of the seventh lens, and f8 denotes a focal length of the eighth lens.

As an improvement, the camera optical lens further satisfies: $-0.98 \leq (R1+R2)/(R1-R2) \leq 0.71$; and $0.02 \leq d1/TTL \leq 0.07$, where R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

As an improvement, the camera optical lens further satisfies: $6.08 \leq f2/f \leq 61.89$; $-205.16 \leq (R3+R4)/(R3-R4) \leq -7.20$; and $0.02 \leq d3/TTL \leq 0.06$, where f2 denotes a focal length of the second lens, R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

As an improvement, the camera optical lens further satisfies: $1.19 \leq f3/f \leq 5.96$; $0.47 \leq (R5+R6)/(R5-R6) \leq 3.21$; and $0.03 \leq d5/TTL \leq 0.10$, where f3 denotes a focal length of the third lens, R5 denotes a central curvature radius of an object side surface of the third lens, R6 denotes a central curvature radius of the image side surface of the third lens, and TTL denotes a total optical length from an object side surface of the first lens to an image plane of the camera optical lens along an optic axis.

As an improvement, the camera optical lens further satisfies: $-3.20 \leq f4/f \leq -0.96$; $-1.28 \leq (R7+R8)/(R7-R8) \leq -0.28$; and $0.02 \leq d7/TTL \leq 0.06$, where f4 denotes a focal length of the fourth lens, R7 denotes a central curvature radius of the object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens further satisfies: $0.93 \leq f5/f \leq 3.33$; $0.00 \leq (R9+R10)/(R9-R10) \leq 0.35$; and $0.04 \leq d9/TTL \leq 0.12$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens further satisfies: $-279.48 \leq f6/f \leq 49.48$; $-24.88 \leq (R11+R12)/(R11-R12) \leq 73.76$; and $0.02 \leq d11/TTL \leq 0.06$, where f6 denotes a focal length of the sixth lens, R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object side surface of the first lens to an image plane of the camera optical lens along an optic axis.

As an improvement, the camera optical lens further satisfies: $0.39 \leq f7/f \leq 1.28$; $1.38 \leq (R13+R14)/(R13-R14) \leq 5.08$; and $0.05 \leq d13/TTL \leq 0.18$, where f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object side surface of the first lens to an image plane of the camera optical lens along an optic axis.

As an improvement, the camera optical lens further satisfies: $-18.77 \leq f8/f \leq -1.35$; $2.49 \leq (R15+R16)/(R15-R16)$ ≤18.86; and 0.03≤d15/TTL≤0.08, where f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object side surface of the first lens to an image plane of the camera optical lens along an optic axis.

As an improvement, the camera optical lens further satisfies: −3.78≤f9/f≤−0.69; 0.77≤(R17+R18)/(R17−R18) ≤5.39; and 0.04≤d17/TTL≤0.13, where f9 denotes a focal length of the ninth lens, R17 denotes a central curvature radius of an object side surface of the ninth lens, R18 denotes a central curvature radius of an image side surface of the ninth lens, d17 denotes an on-axis thickness of the ninth lens, and TTL denotes a total optical length from an object side surface of the first lens to an image plane of the camera optical lens along an optic axis.

The present invention has the following beneficial effects: the camera optical lens according to the present invention has excellent optical characteristics and has the characteristics of a large aperture, a wide angle, and ultra-thinness, and is particularly applicable to the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts. In the drawings.

DESCRIPTION OF EMBODIMENTS

In order to better illustrate the purpose, technical solutions and advantages of the present invention, the embodiments of the present invention will be described in details as follows with reference to the accompanying drawings. However, it should be understood by those skilled in the art that, technical details are set forth in the embodiments of the present invention so as to better illustrate the present invention. However, the technical solutions claimed in the present invention can be achieved without these technical details and various changes and modifications based on the following embodiments.

First Embodiment

Figure 1:
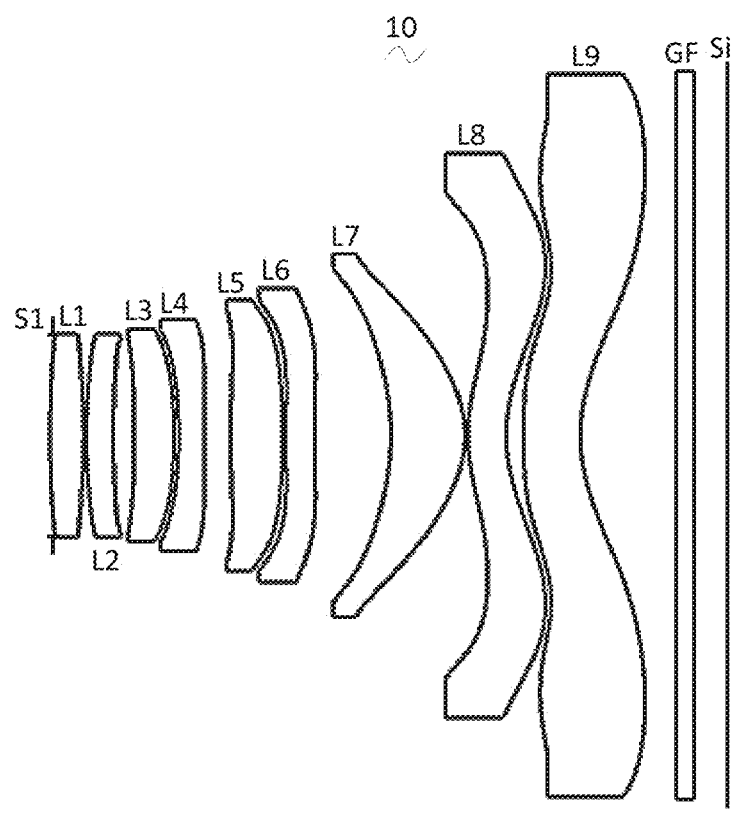
FIG. 1 is a schematic structural diagram of a camera optical lens according to a first embodiment of the present invention.

Referring to the figures, an embodiment of the present invention provides a camera optical lens 10. FIG. 1 illustrates a camera optical lens 10 according to the first embodiment of the present invention. The camera optical lens 10 includes nine lenses. The camera optical lens 10 includes from an object side to an image side: an aperture S1, a first lens L1, a second lens L2, a third lens L3, a fourth lens L4, a fifth lens L5, a sixth lens L6, a seventh lens L7, an eighth lens L8, and a ninth lens L9. An optical element such as an optical filter GF may be provided between the ninth lens L9 and an image surface Si.

In this embodiment, the first lens L1 has positive refractive power, the second lens L2 has positive refractive power, the third lens L3 has positive refractive power, the fourth lens L4 has negative refractive power, the fifth lens L5 has positive refractive power, the sixth lens L6 has negative refractive power, the seventh lens L7 has positive refractive power, the eighth lens L8 has negative refractive power, and the ninth lens L9 has negative refractive power.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, the eighth lens L8 is made of a plastic material, and the ninth lens L9 is made of a plastic material. In other embodiments, each of the lenses may also be made of another material.

In this embodiment, it is defined that a focal length of the camera optical lens 10 is f, and a focal length of the first lens L1 is f1, then the camera optical lens satisfies the following condition: 2.00≤f1/f≤3.50, which specifies a ratio of the focal length f1 of the first lens to the focal length f of the camera optical lens 10 and can effectively balance spherical aberration and field curvature of the system. For example, the camera optical lens satisfies the following condition: the condition 2.03≤f1/f≤3.43.

In this embodiment, it is defined that the second lens has positive refractive power, which is conducive to improving performance of an optical system.

It is defined that an on-axis thickness of the third lens is d5, and an on-axis distance from an image side surface of the third lens to an object side surface of the fourth lens is d6, then the camera optical lens satisfies the following condition: 2.00≤d5/d6≤9.00, which specifies a ratio of the on-axis thickness d5 of the third lens to the on-axis distance d6 from the image side surface of the third lens to the object side surface of the fourth lens. Within a range defined by this condition, it is conducive to reducing a total length of the optical system, thereby achieving ultra-thinness. For example, the camera optical lens satisfies the following condition: 2.25≤d5/d6≤8.9.

It is defined that a focal length of the seventh lens L7 is f7, and a focal length of the eighth lens L8 is f8, then the camera optical lens satisfies the following condition:

$-12.00 \leq f8/f7 \leq -2.50$, which specifies a ratio of the focal length of the eighth lens to the focal length of the seventh lens. Reasonable configuration of the focal length of each lens enables the system to have better imaging quality and lower sensitivity. For example, the camera optical lens satisfies the following condition: $-11.51 \leq f8/f7 \leq -2.55$.

In this embodiment, the object side surface of the first lens L1 is a convex surface at a paraxial position, and the image side surface of the first lens L1 is a convex surface at the paraxial position.

It is defined that a central curvature radius of an object side surface of the first lens L1 is R1, and a central curvature radius of an image side surface of the first lens L1 is R2, then the camera optical lens satisfies the following condition: $-0.98 \leq (R1+R2)/(R1-R2) \leq 0.71$. The shape of the first lens L1 is reasonably controlled, so that the first lens L1 can effectively correct spherical aberration of the system. For example, the camera optical lens satisfies the following condition: $-0.61 \leq (R1+R2)/(R1-R2) \leq 0.56$.

An on-axis thickness of the first lens L1 is d1, and a total optical length of the camera optical lens 10 is TTL, then the camera optical lens satisfies the following condition: $0.02 \leq d1/TTL \leq 0.07$. Within a range defined by this condition, it is conducive to achieving ultra-thinness. For example, the camera optical lens satisfies the following condition: $0.03 \leq d1/TTL \leq 0.06$.

In this embodiment, the object side surface of the second lens L2 is a convex surface at a paraxial position, and the image side surface of the second lens L2 is a concave surface at the paraxial position.

It is defined that a focal length of the camera optical lens 10 is f, and a focal length of the second lens L2 is f2, then the camera optical lens satisfies the following condition: $6.08 \leq f2/f \leq 61.89$. By controlling positive refractive power of the second lens L2 within a reasonable range, it is conducive to correcting aberration of the optical system. For example, the camera optical lens satisfies the following condition: $9.73 \leq f2/f \leq 49.51$.

A central curvature radius of an object side surface of the second lens L2 is R3, and a central curvature radius of an image side surface of the second lens L2 is R4, then the camera optical lens satisfies the following condition: $-205.16 \leq (R3+R4)/(R3-R4) \leq -7.20$, which specifies a shape of the second lens L2. Within a range defined by this condition, with development of ultra-thinness and wide-angle of the camera optical lens, it is conducive to correcting the problem of longitudinal aberration. For example, the camera optical lens satisfies the following condition: $-128.22 \leq (R3+R4)/(R3-R4) \leq -9.00$.

An on-axis thickness of the second lens L2 is d3, and a total optical length of the camera optical lens 10 is TTL, then the camera optical lens satisfies the following condition: $0.02 \leq d3/TTL \leq 0.06$. Within a range defined by this condition, it is conducive to achieving ultra-thinness. For example, the camera optical lens satisfies the following condition: $0.03 \leq d3/TTL \leq 0.05$.

In this embodiment, the object side surface of the third lens L3 is a concave surface at a paraxial position, and the image side surface of the third lens L3 is a convex surface at the paraxial position.

It is defined that a focal length of the camera optical lens 10 is f, and a focal length of the third lens L3 is f3, then the camera optical lens satisfies the following condition: $1.19 \leq f3/f \leq 5.96$. Reasonable configuration of the focal length of each lens enables the system to have better imaging quality and lower sensitivity. For example, the camera optical lens satisfies the following condition: $1.90 \leq f3/f \leq 4.77$.

A central curvature radius of an object side surface of the third lens L3 is R5, and a central curvature radius of an image side surface of the third lens L3 is R6, then the camera optical lens satisfies the following condition: $0.47 \leq (R5+R6)/(R5-R6) \leq 3.21$, which specifies a shape of the third lens L3 and is conducive to forming of the third lens L3. Within a range defined by this condition, it is conductive to alleviating a deflection degree of light passing through the lens, thereby effectively reducing aberration. For example, the camera optical lens satisfies the following condition: $0.75 \leq (R5+R6)/(R5-R6) \leq 2.57$.

An on-axis thickness of the third lens L3 is d5, and a total optical length of the camera optical lens 10 is TTL, then the camera optical lens satisfies the following condition: $0.03 \leq d5/TTL \leq 0.10$. Within a range defined by this condition, it is conducive to achieving ultra-thinness. For example, the camera optical lens satisfies the following condition: $0.05 \leq d5/TTL \leq 0.08$.

In this embodiment, the object side surface of the fourth lens L4 is a concave surface at a paraxial position, and the image side surface of the fourth lens is a concave surface at the paraxial position.

It is defined that a focal length of the camera optical lens 10 is f, and a focal length of the fourth lens L4 is f4, then the camera optical lens satisfies the following condition: $-3.20 \leq f4/f \leq -0.96$. Reasonable configuration of the focal length of each lens enables the system to have better imaging quality and lower sensitivity. For example, the camera optical lens satisfies the following condition: $-2.00 \leq f4/f \leq -1.21$.

A central curvature radius of an object side surface of the fourth lens L4 is R7, and a central curvature radius of an image side surface of the fourth lens L4 is R8, then the camera optical lens satisfies the following condition: $-1.28 \leq (R7+R8)/(R7-R8) \leq -0.28$, which specifies a shape of the fourth lens L4. Within a range defined by this condition, with development of ultra-thinness and wide angle, it is conducive to correcting the problems such as off-axis aberration. For example, the camera optical lens satisfies the following condition: $-0.80 \leq (R7+R8)/(R7-R8) \leq -0.35$.

An on-axis thickness of the fourth lens L4 is d7, and a total optical length of the camera optical lens 10 is TTL, then the camera optical lens satisfies the following condition: $0.02 \leq d7/TTL \leq 0.06$. Within a range defined by this condition, it is conducive to achieving ultra-thinness. For example, the camera optical lens satisfies the following condition: $0.03 \leq d7/TTL \leq 0.04$.

In this embodiment, the object side surface of the fifth lens L5 is a convex surface at a paraxial position, and the image side surface of the fifth lens L5 is a convex surface at the paraxial position.

It is defined that a focal length of the camera optical lens 10 is f, and a focal length of the fifth lens L5 is f5, then the camera optical lens satisfies the following condition: $0.93 \leq f5/f \leq 3.33$. The limitation on the fifth lens L5 can effectively smooth a light angle of the camera optical lens and reduce tolerance sensitivity. For example, the camera optical lens satisfies the following condition: $1.48 \leq f5/f \leq 2.66$.

A central curvature radius of an object side surface of the fifth lens L5 is R9, and a central curvature radius of an image side surface of the fifth lens L5 is R10, then the camera optical lens satisfies the following condition: $0.00 \leq (R9+R10)/(R9-R10) \leq 0.35$, which specifies a shape of the fifth lens L5. Within a range defined by this condition, with development of ultra-thinness and wide-angle, it is conducive to correcting the problems such as off-axis aberration. For example, the camera optical lens satisfies the following condition: $0.01 \leq (R9+R10)/(R9-R10) \leq 0.28$.

An on-axis thickness of the fifth lens L5 is d9, and a total optical length of the camera optical lens 10 is TTL, then the camera optical lens satisfies the following condition: $0.04 \leq d9/TTL \leq 0.12$. Within a range defined by this condition, it is conducive to achieving ultra-thinness. For example, the camera optical lens satisfies the following condition: $0.06 \leq d9/TTL \leq 0.09$.

In this embodiment, the object side surface of the sixth lens L6 is a convex surface at a paraxial position, and the image side surface of the sixth lens L65 is a concave surface at the paraxial position.

It is defined that a focal length of the camera optical lens 10 is f, and a focal length of the sixth lens L6 is f6, then the camera optical lens satisfies the following condition: $-279.48 \leq f6/f \leq 49.48$. Reasonable configuration of the focal length of each lens enables the system to have better imaging quality and lower sensitivity. For example, the camera optical lens satisfies the following condition: $-174.67 \leq f6/f \leq 39.58$.

A central curvature radius of an object side surface of the sixth lens L6 is R11, and a central curvature radius of an image side surface of the sixth lens L6 is R12, then the camera optical lens satisfies the following condition: $-24.88 \leq (R11+R12)/(R11-R12) \leq 73.76$, which specifies a shape of the sixth lens L6. Within a range defined by this condition, with development of ultra-thinness and wide-angle, it is conducive to correcting the problems such as off-axis aberration. For example, the camera optical lens satisfies the following condition: $-15.55 \leq (R11+R12)/(R11-R12) \leq 59.01$.

An on-axis thickness of the sixth lens L6 is d11, and a total optical length of the camera optical lens 10 is TTL, then the camera optical lens satisfies the following condition: $0.02 \leq d11/TTL \leq 0.06$. Within a range defined by this condition, it is conducive to achieving ultra-thinness. For example, the camera optical lens satisfies the following condition: $0.03 \leq d11/TTL \leq 0.05$.

In this embodiment, the object side surface of the seventh lens L7 is a concave surface at a paraxial position, and the image side surface of the seventh lens L7 is a convex surface at the paraxial position.

It is defined that a focal length of the camera optical lens 10 is f, and a focal length of the seventh lens L7 is f7, then the camera optical lens satisfies the following condition: $0.39 \leq f7/f \leq 1.28$. Reasonable configuration of the focal length of each lens enables the system to have better imaging quality and lower sensitivity. For example, the camera optical lens satisfies the following condition: $0.63 \leq f7/f \leq 1.02$.

A central curvature radius of an object side surface of the seventh lens L7 is R13, and a central curvature radius of an image side surface of the seventh lens L7 is R14, then the camera optical lens satisfies the following condition: $1.38 \leq (R13+R14)/(R13-R14) \leq 5.08$, which specifies a shape of the seventh lens L7. Within a range defined by this condition, with development of ultra-thinness and wide-angle, it is conducive to correcting the problems such as off-axis aberration. For example, the camera optical lens satisfies the following condition: $2.20 \leq (R13+R14)/(R13-R14) \leq 4.06$.

An on-axis thickness of the seventh lens L7 is d13, and a total optical length of the camera optical lens 10 is TTL, then the camera optical lens satisfies the following condition: $0.05 \leq d13/TTL \leq 0.18$. Within a range defined by this condition, it is conducive to achieving ultra-thinness. For example, the camera optical lens satisfies the following condition: $0.09 \leq d13/TTL \leq 0.15$.

In this embodiment, the object side surface of the eighth lens L8 is a convex surface at a paraxial position, and the image side surface of the eighth lens L8 is a concave surface at the paraxial position.

It is defined that a focal length of the camera optical lens 10 is f, and a focal length of the eighth lens L8 is f8, then the camera optical lens satisfies the following condition: $-18.77 \leq f8/f \leq -1.35$. Reasonable configuration of the focal length of each lens enables the system to have better imaging quality and lower sensitivity. For example, the camera optical lens satisfies the following condition: $-11.73 \leq f8/f \leq -1.69$.

A central curvature radius of an object side surface of the eighth lens L8 is R15, and a central curvature radius of an image side surface of the eighth lens L8 is R16, then the camera optical lens satisfies the following condition: $2.49 \leq (R15+R16)/(R15-R16) \leq 18.86$, which specifies a shape of the eighth lens. Within a range defined by this condition, with development of ultra-thinness and wide-angle, it is conducive to correcting the problems such as off-axis aberration. For example, the camera optical lens satisfies the following condition: $3.98 \leq (R15+R16)/(R15-R16) \leq 15.09$.

An on-axis thickness of the eighth lens L8 is d15, and a total optical length of the camera optical lens 10 is TTL, then the camera optical lens satisfies the following condition: $0.03 \leq d15/TTL \leq 0.08$. Within a range defined by this condition, it is conducive to achieving ultra-thinness. For example, the camera optical lens satisfies the following condition: $0.04 \leq d15/TTL \leq 0.07$.

In this embodiment, the object side surface of the ninth lens L9 is a convex surface at a paraxial position, and the image side surface of the ninth lens L9 is a concave surface at the paraxial position.

It is defined that a focal length of the camera optical lens 10 is f, and a focal length of the ninth lens L9 is f9, then the camera optical lens satisfies the following condition: $-3.78 \leq f9/f \leq -0.69$. Reasonable configuration of the focal length of each lens enables the system to have better imaging quality and lower sensitivity. For example, the camera optical lens satisfies the following condition: $-2.36 \leq f9/f \leq -0.86$.

A central curvature radius of an object side surface of the ninth lens L9 is R17, and a central curvature radius of an image side surface of the ninth lens L9 is R18, then the camera optical lens satisfies the following condition: $0.77 \leq (R17+R18)/(R17-R18) \leq 5.39$, which specifies a shape of the ninth lens. Within a range defined by this condition, with development of ultra-thinness and wide-angle, it is conducive to correcting the problems such as off-axis aberration. For example, the camera optical lens satisfies the following condition: $1.23 \leq (R17+R18)/(R17-R18) \leq 4.31$.

An on-axis thickness of the ninth lens L9 is d17, and a total optical length of the camera optical lens 10 is TTL, then the camera optical lens satisfies the following condition: $0.04 \leq d17/TTL \leq 0.13$. Within a range defined by this condition, it is conducive to achieving ultra-thinness. For example, the camera optical lens satisfies the following condition: $0.06 \leq d17/TTL \leq 0.10$.

In this embodiment, an image height of the camera optical lens 10 is IH, and a total optical length of the camera optical lens 10 is TTL, then the camera optical lens satisfies the following condition: $TTL/IH \leq 1.86$, thereby being conductive to achieving ultra-thinness.

In this embodiment, a field of view FOV of the camera optical lens 10 is larger than or equal to 85°, thereby achieving a wide angle.

In this embodiment, an F number FNO of the camera optical lens 10 is smaller than or equal to 1.95, thereby achieving a large aperture and good imaging performance of the camera optical lens.

When the above conditions are satisfied, the camera optical lens 10 can meet design requirements of a large aperture, a wide angle, and ultra-thinness while having good optical performance. According to the characteristics of the camera optical lens 10, the camera optical lens 10 is particularly applicable to the mobile phone camera lens assembly and the WEB camera lens composed of imaging elements such as CCD and CMOS for high pixels.

The camera optical lens 10 of the present invention will be described in the following with examples. The symbols listed in the examples are shown as follows. The focal length, the on-axis distance, the central curvature radius, the on-axis thickness, the inflection point position, and the arrest point position are all in units of mm.

TTL: total optical length (an on-axis distance from the object side surface of the first lens L1 to an image surface Si), in units of mm.

F number FNO: ratio of an effective focal length of the camera optical lens to an entrance pupil diameter.

In an example, the object side surface and/or the image side surface of the lens may also be provided with an inflection point and/or an arrest point to meet high-quality imaging requirements. For specific embodiment schemes, reference may be made to the following description.

Table 1 and Table 2 show design data of the camera optical lens 10 according to the first embodiment of the present invention.

TABLE 1

| | R | d | | nd | | vd |
|---|---|---|---|---|---|---|
| S1 | ∞ | d0= | −0.033 | | | |
| R1 | 19.689 | d1= | 0.384 | nd1 | 1.5444 | v1 | 55.82 |
| R2 | −7.096 | d2= | 0.030 | | | |
| R3 | 7.098 | d3= | 0.312 | nd2 | 1.6700 | v2 | 19.39 |
| R4 | 8.547 | d4= | 0.241 | | | |
| R5 | −17.724 | d5= | 0.457 | nd3 | 1.5346 | v3 | 55.69 |
| R6 | −6.443 | d6= | 0.051 | | | |
| R7 | −6.750 | d7= | 0.290 | nd4 | 1.6610 | v4 | 20.53 |
| R8 | 19.498 | d8= | 0.307 | | | |
| R9 | 14.735 | d9= | 0.600 | nd5 | 1.5444 | v5 | 55.82 |
| R10 | −9.106 | d10= | 0.030 | | | |
| R11 | 13.773 | d11= | 0.330 | nd6 | 1.6610 | v6 | 20.53 |
| R12 | 13.224 | d12= | 0.879 | | | |
| R13 | −2.910 | d13= | 0.851 | nd7 | 1.5346 | v7 | 55.69 |
| R14 | −1.358 | d14= | 0.033 | | | |
| R15 | 2.240 | d15= | 0.438 | nd8 | 1.5661 | v8 | 37.71 |
| R16 | 1.910 | d16= | 0.202 | | | |
| R17 | 9.499 | d17= | 0.650 | nd9 | 1.5444 | v9 | 55.82 |
| R18 | 2.024 | d18= | 1.100 | | | |
| R19 | ∞ | d19= | 0.210 | ndg | 1.5168 | vg | 64.17 |
| R20 | ∞ | d20= | 0.380 | | | |

Meanings of the symbols are as follows.

S1: aperture;
R: curvature radius at a center of an optical surface;
R1: central curvature radius of an object side surface of the first lens L1;
R2: central curvature radius of an image side surface of the first lens L1;
R3: central curvature radius of an object side surface of the second lens L2;
R4: central curvature radius of an image side surface of the second lens L2;
R5: central curvature radius of an object side surface of the third lens L3;
R6: central curvature radius of an image side surface of the third lens L3;
R7: central curvature radius of an object side surface of the fourth lens L4;
R8: central curvature radius of an image side surface of the fourth lens L4;
R9: central curvature radius of an object side surface of the fifth lens L5;
R10: central curvature radius of an image side surface of the fifth lens L5;
R11: central curvature radius of an object side surface of the sixth lens L6;
R12: central curvature radius of an image side surface of the sixth lens L6;
R13: central curvature radius of an object side surface of the seventh lens L7;
R14: central curvature radius of an image side surface of the seventh lens L7;
R15: central curvature radius of an object side surface of the eighth lens L8;
R16: central curvature radius of an image side surface of the eighth lens L8;
R17: central curvature radius of an object side surface of the ninth lens L9;
R18: central curvature radius of an image side surface of the ninth lens L9;
R19: central curvature radius of an object side surface of the optical filter GF;
R20: central curvature radius of an image side surface of the optical filter GF;
d: on-axis thickness of the lens and on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the ninth lens L9;
d17: on-axis thickness of the ninth lens L9;

d18: on-axis distance from the image side surface of the ninth lens L9 to the object side surface of the optical filter GF;

d19: on-axis thickness of the optical filter GF;

d20: on-axis distance from the image side surface of the optical filter GF to an image surface Si;

nd: refractive index of d-line;

v8: abbe number of the eighth lens L8;

v9: abbe number of the ninth lens L9; and vg: abbe number of the optical filter GF.

Table 2 shows aspherical data of each lens in the camera optical lens 10 according to the first embodiment of the present invention.

TABLE 2

| | Conic coefficient | Aspherical coefficient | | | | |
|---|---|---|---|---|---|---|
| | k | A4 | A6 | A8 | A10 | A12 |
| R1 | 8.2778E+01 | 1.3341E−02 | 4.2571E−03 | −3.5587E−02 | 8.3245E−02 | −1.2234E−01 |
| R2 | −7.0759E+01 | 4.0022E−02 | −9.5843E−02 | 2.0489E−01 | −3.3498E−01 | 3.6614E−01 |
| R3 | 2.6780E+01 | −7.9247E−03 | −4.9667E−02 | 9.2182E−02 | −7.5115E−02 | −2.3565E−02 |
| R4 | −1.0865E+01 | −4.1845E−02 | 4.7144E−02 | −7.7415E−02 | 1.8145E−01 | −2.8311E−01 |
| R5 | −5.6939E+01 | −1.5709E−02 | 2.4982E−03 | −3.5072E−02 | 6.1929E−02 | −5.6383E−02 |
| R6 | 3.8365E+00 | −1.5842E−02 | −1.8286E−02 | −1.1052E−01 | 2.7442E−01 | −2.6100E−01 |
| R7 | 1.8590E+01 | −2.4311E−02 | 1.0273E−02 | −1.2072E−01 | 2.7972E−01 | −2.6756E−01 |
| R8 | −7.8627E+01 | −3.4141E−02 | 3.4766E−03 | −1.4438E−02 | 2.5857E−02 | −2.2392E−02 |
| R9 | −9.9000E+01 | −1.2269E−03 | 1.0172E−02 | −4.0883E−02 | 3.8080E−02 | −2.0446E−02 |
| R10 | 2.3255E+01 | −3.4790E−02 | 8.2335E−02 | −1.2153E−01 | 9.0652E−02 | −3.8531E−02 |
| R11 | −9.9000E+01 | −4.7545E−02 | −2.9009E−02 | 5.7824E−02 | −8.7377E−02 | 7.8631E−02 |
| R12 | −3.3105E+01 | −1.0306E−02 | −6.9055E−02 | 8.8524E−02 | −7.6652E−02 | 4.4892E−02 |
| R13 | −1.3455E+01 | −1.8594E−02 | 5.4405E−03 | −3.9443E−03 | 9.3146E−04 | −6.9889E−05 |
| R14 | −2.9524E+00 | −3.4517E−02 | 8.9075E−03 | −2.1942E−03 | 3.2050E−04 | −7.3088E−06 |
| R15 | −4.8311E+00 | −1.9434E−02 | −2.9341E−02 | 2.2652E−02 | −8.3509E−03 | 1.8907E−03 |
| R16 | −1.8618E+00 | −4.3455E−02 | 1.4802E−02 | −7.1658E−03 | 2.2139E−03 | −4.1707E−04 |
| R17 | −4.6833E+01 | 8.1151E−02 | −3.2141E−02 | 4.3801E−03 | −1.1947E−04 | −3.3561E−05 |
| R18 | −8.1663E−01 | −3.7816E−02 | 4.5613E−03 | −1.1237E−03 | 2.3464E−04 | −2.9691E−05 |
| | Conic coefficient | Aspherical coefficient | | | |
| | k | A14 | A16 | A18 | A20 |
| R1 | 8.2778E+01 | 1.1041E−01 | −5.9983E−02 | 1.7986E−02 | −2.2874E−03 |
| R2 | −7.0759E+01 | −2.6001E−01 | 1.1441E−01 | −2.8170E−02 | 2.9434E−03 |
| R3 | 2.6780E+01 | 1.1859E−01 | −1.1223E−01 | 4.7463E−02 | −7.8564E−03 |
| R4 | −1.0865E+01 | 2.8589E−01 | −1.7331E−01 | 5.7424E−02 | −7.9466E−03 |
| R5 | −5.6939E+01 | 2.8378E−02 | −5.8057E−03 | 0.0000E+00 | 0.0000E+00 |
| R6 | 3.8365E+00 | 1.1516E−01 | −1.9732E−02 | 0.0000E+00 | 0.0000E+00 |
| R7 | 1.8590E+01 | 1.1760E−01 | −1.8236E−02 | −1.8286E−03 | 5.3606E−04 |
| R8 | −7.8627E+01 | 8.4965E−03 | −1.1853E−03 | 0.0000E+00 | 0.0000E+00 |
| R9 | −9.9000E+01 | 6.0270E−03 | −7.1224E−04 | 0.0000E+00 | 0.0000E+00 |
| R10 | 2.3255E+01 | 8.5511E−O3 | −7.4799E−04 | 0.0000E+00 | 0.0000E+00 |
| R11 | −9.9000E+01 | −4.0311E−02 | 1.1578E−02 | −1.7225E−03 | 1.0309E−04 |
| R12 | −3.3105E+01 | −1.6873E−02 | 3.8756E−03 | −4.9515E−04 | 2.7148E−05 |
| R13 | −1.3455E+01 | 0.0000E+00 | 0.0000E+00 | 0.0000E+00 | 0.0000E+00 |
| R14 | −2.9524E+00 | 0.0000E+00 | 0.0000E+00 | 0.0000E+00 | 0.0000E+00 |
| R15 | −4.8311E+00 | −2.7586E−04 | 2.5062E−05 | −1.2764E−06 | 2.7635E−08 |
| R16 | −1.8618E+00 | 4.8329E−05 | −3.3543E−06 | 1.2780E−07 | −2.0568E−09 |
| R17 | −4.6833E+01 | 4.4432E−06 | −2.5048E−07 | 7.0421E−09 | −8.0776E−11 |
| R18 | −8.1663E−01 | 2.2374E−06 | −9.9390E−08 | 2.4116E−09 | −2.4762E−11 | nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
nd8: refractive index of d-line of the eighth lens L8;
nd9: refractive index of d-line of the ninth lens L9;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;

Herein, k is a conic coefficient, and A4, A6, A8, A10, A12, A14, A16, A18, and A20 are aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Herein, x is a vertical distance between a point on an aspherical curve and the optic axis, and y is an aspherical depth (a vertical distance between a point on an aspherical surface at a distance of x from the optic axis and a tangent plane tangent to a vertex on an aspherical optic axis).

For convenience, the aspherical surface of each lens surface uses the aspherical surface shown in the above formula (1). However, the present invention is not limited to the aspherical surface defined by the polynomial form expressed by the formula (1).

Table 3 and Table 4 show design data of inflection points and arrest points of each lens in the camera optical lens 10 according to the first embodiment of the present invention. P1R1 and P1R2 represent the object side surface and the image side surface of the first lens L1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. P6R1 and P6R2 represent the object side surface and the image side surface of the sixth lens L6, respectively. P7R1 and P7R2 represent the object side surface and the image side surface of the seventh lens L7, respectively. P8R1 and P8R2 represent the object side surface and the image side surface of the eighth lens L8, respectively. P9R1 and P9R2 represent the object side surface and the image side surface of the ninth lens L9, respectively. Data corresponding to the "reflection point position" column represents a vertical distance from the inflection point disposed on the surface of each lens to the optic axis of the camera optical lens 10. Data corresponding to the "arrest point position" column represents a vertical distance from the arrest point disposed on the surface of each lens to the optic axis of the camera optical lens 10.

TABLE 3

| | Number of reflection points | Reflection point position 1 | Reflection point position 2 | Reflection point position 3 |
|---|---|---|---|---|
| P1R1 | 1 | 1.065 | / | / |
| P1R2 | 0 | / | / | / |
| P2R1 | 0 | / | / | / |
| P2R2 | 0 | / | / | / |
| P3R1 | 1 | 1.145 | / | / |
| P3R2 | 0 | / | / | / |
| P4R1 | 0 | / | / | / |
| P4R2 | 1 | 0.355 | / | / |
| P5R1 | 2 | 0.665 | 1.485 | / |
| P5R2 | 0 | / | / | / |
| P6R1 | 2 | 0.335 | 1.575 | / |
| P6R2 | 2 | 0.445 | 1.675 | / |
| P7R1 | 0 | / | / | / |
| P7R2 | 1 | 1.795 | / | / |
| P8R1 | 2 | 0.765 | 2.755 | / |
| P8R2 | 3 | 1.075 | 2.985 | 3.165 |
| P9R1 | 3 | 1.295 | 2.485 | 3.805 |
| P9R2 | 1 | 1.315 | / | / |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 1 | 0.605 | / |
| P5R1 | 1 | 0.975 | / |
| P5R2 | 0 | / | / |
| P6R1 | 1 | 0.555 | / |
| P6R2 | 1 | 0.715 | / |
| P7R1 | 0 | / | / |
| P7R2 | 0 | / | / |
| P8R1 | 1 | 1.685 | / |
| P8R2 | 1 | 2.025 | / |
| P9R1 | 2 | 1.985 | 3.055 |
| P9R2 | 1 | 3.175 | / |

Figure 2:
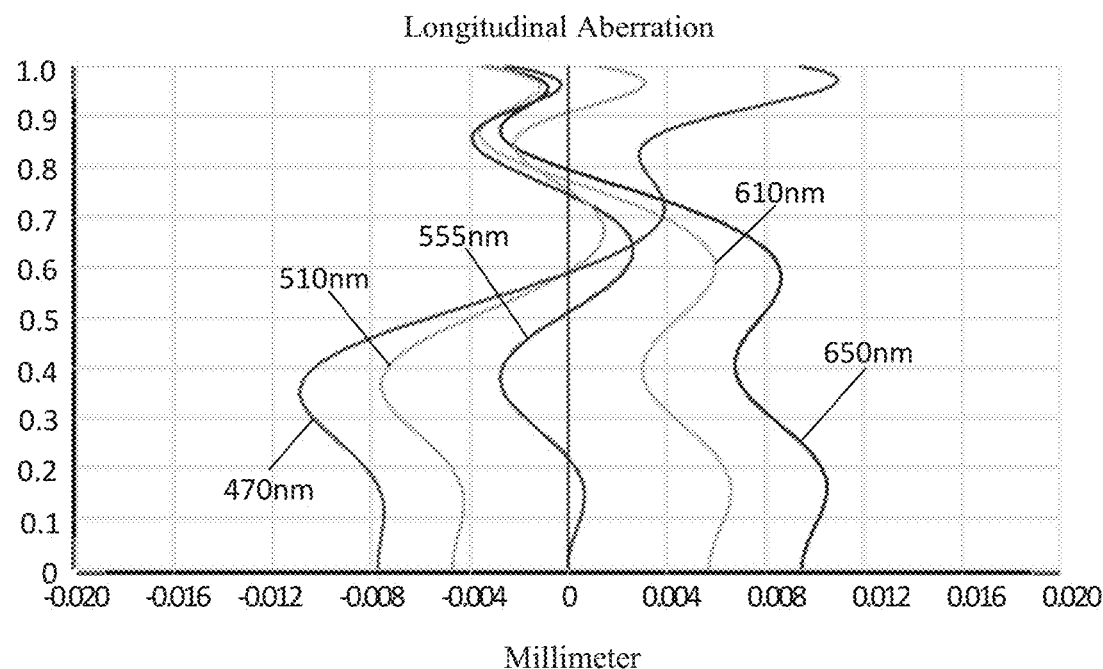
FIG. 2 is a schematic diagram of longitudinal aberration of the camera optical lens shown in FIG. 1.
Figure 3:
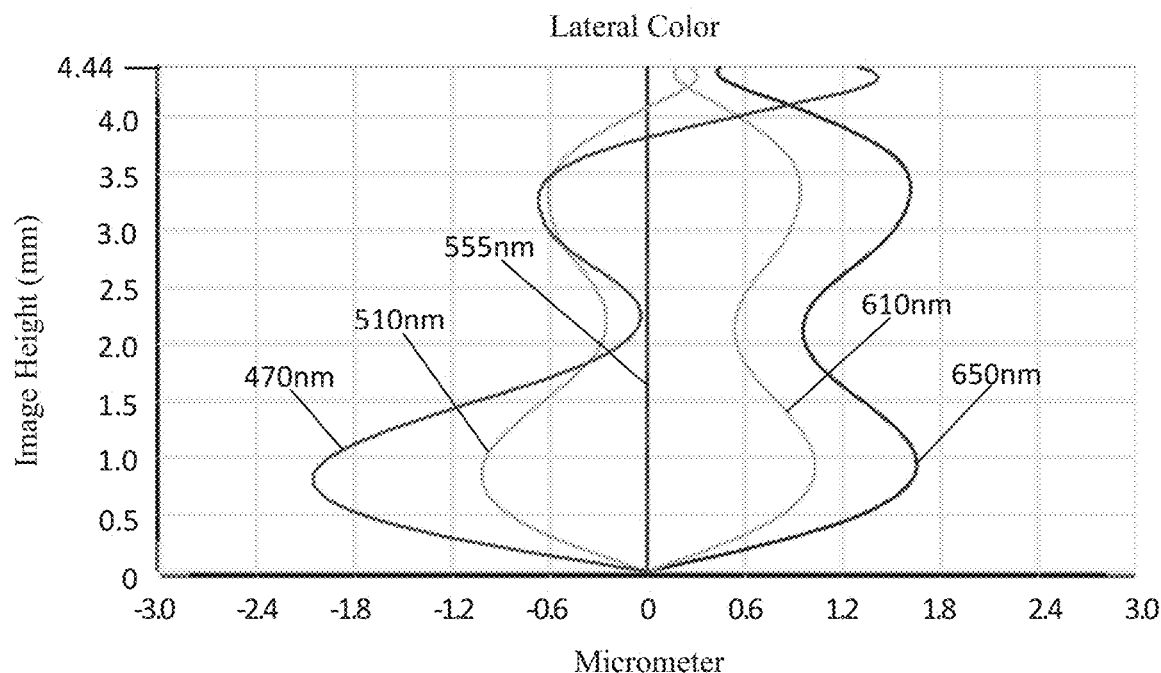
FIG. 3 is a schematic diagram of lateral color of the camera optical lens shown in FIG. 1.
Figure 4:
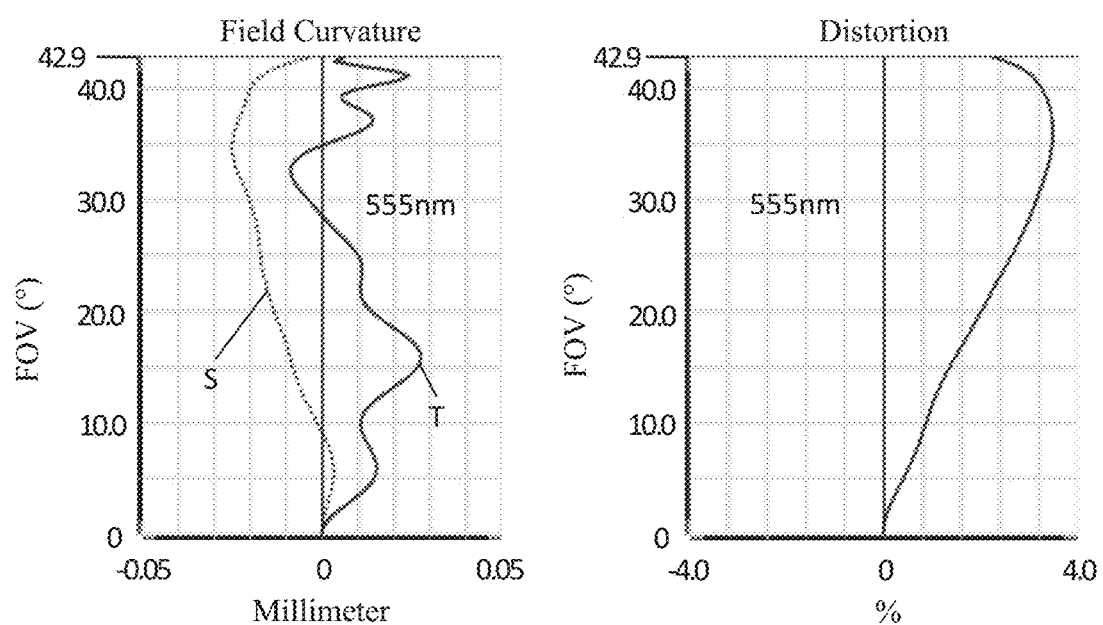
FIG. 4 is a schematic diagram of field curvature and distortion of the camera optical lens shown in FIG. 1.

FIG. 2 and FIG. 3 respectively show schematic diagrams of longitudinal aberration and lateral color after light with wavelengths of 650 nm, 610 nm, 555 nm, 510 nm, and 470 nm passes through the camera optical lens 10 in the first embodiment. FIG. 4 shows a schematic diagram of field curvature and distortion after light with a wavelength of 555 nm passes through the camera optical lens 10 in the first embodiment. In FIG. 4, the field curvature S is field curvature in a sagittal direction, and T is field curvature in a meridional direction.

Table 13 below shows various values in embodiments 1, 2, and 3 and values corresponding to parameters specified in the conditions.

As shown in Table 13, the first embodiment satisfies each condition.

In this embodiment, the camera optical lens 10 has an entrance pupil diameter ENPD of 2.402 mm, a full field-of-view image height IH of 4.443 mm, and a diagonal field-of-view FOV of 85.80°, so that the camera optical lens 10 meets design requirements of a large aperture, a wide angle, and ultra-thinness, has fully corrected on-axis and off-axis chromatic aberration, and has excellent optical characteristics.

Second Embodiment

Figure 5:
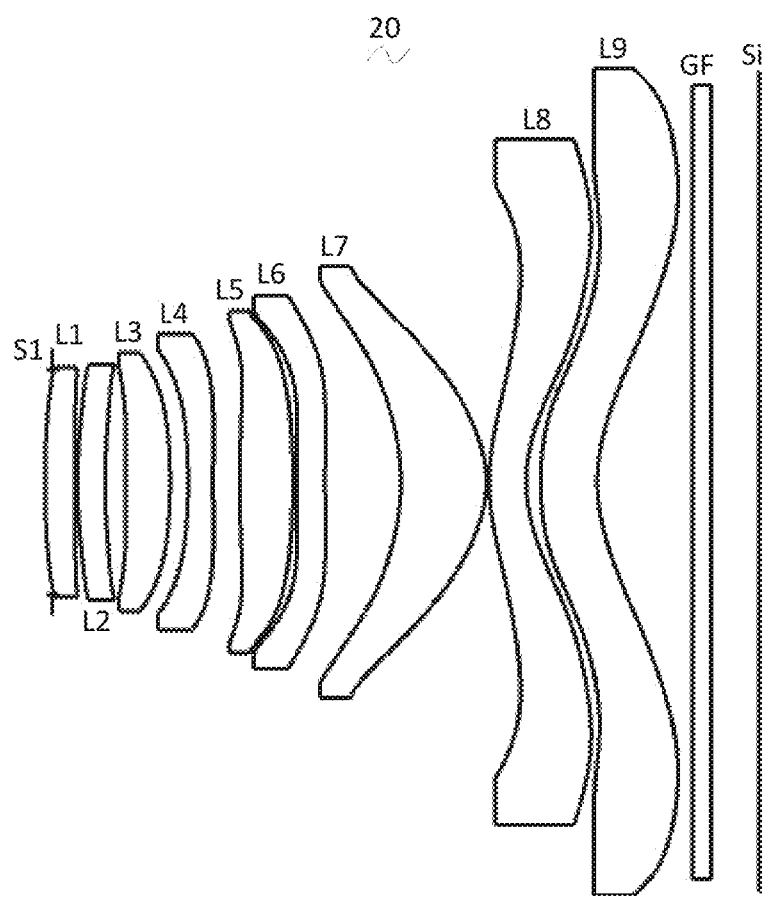
FIG. 5 is a schematic structural diagram of a camera optical lens according to a second embodiment of the present invention.

FIG. 5 illustrates a camera optical lens 20 according to the second embodiment of the present invention.

The second embodiment is basically the same as the first embodiment. The meanings of the symbols are the same as those in the first embodiment. Only a difference thereof is described in the following.

In this embodiment, the object side surface of the third lens 3 is a convex surface at a paraxial position. The sixth lens L6 has positive refractive power.

Table 5 and Table 6 show design data of the camera optical lens 20 according to the second embodiment of the present invention.

TABLE 5

| | R | d | | nd | | vd |
|---|---|---|---|---|---|---|
| S1 | ∞ | d0= | −0.084 | | | |
| R1 | 11.683 | d1= | 0.344 | nd1 | 1.5444 v1 | 55.82 |
| R2 | −34.233 | d2= | 0.030 | | | |
| R3 | 5.536 | d3= | 0.314 | nd2 | 1.6700 v2 | 19.39 |
| R4 | 5.645 | d4= | 0.245 | | | |
| R5 | 192.630 | d5= | 0.510 | nd3 | 1.5346 v3 | 55.69 |
| R6 | −6.258 | d6= | 0.204 | | | |
| R7 | −7.001 | d7= | 0.290 | nd4 | 1.6610 v4 | 20.53 |
| R8 | 17.324 | d8= | 0.307 | | | |
| R9 | 9.604 | d9= | 0.613 | nd5 | 1.5444 v5 | 55.82 |
| R10 | −9.458 | d10= | 0.048 | | | |
| R11 | 17.635 | d11= | 0.330 | nd6 | 1.6610 v6 | 20.53 |
| R12 | 21.282 | d12= | 0.873 | | | |
| R13 | −2.236 | d13= | 0.981 | nd7 | 1.5346 v7 | 55.69 |
| R14 | −1.216 | d14= | 0.033 | | | |
| R15 | 2.174 | d15= | 0.425 | nd8 | 1.5661 v8 | 37.71 |
| R16 | 1.446 | d16= | 0.171 | | | |
| R17 | 3.152 | d17= | 0.650 | nd9 | 1.5444 v9 | 55.82 |
| R18 | 1.779 | d18= | 1.100 | | | |
| R19 | ∞ | d19= | 0.210 | ndg | 1.5168 vg | 64.17 |
| R20 | ∞ | d20= | 0.562 | | | |

Table 6 shows aspherical data of each lens in the camera optical lens 20 according to the second embodiment of the present invention.

TABLE 6

| | Conic coefficient | Aspherical coefficient | | | | |
|---|---|---|---|---|---|---|
| | k | A4 | A6 | A8 | A10 | A12 |
| R1 | 4.5153E+01 | 1.9499E-02 | -7.8052E-03 | -1.7658E-03 | 1.3931E-02 | -2.3464E-02 |
| R2 | -9.9000E+01 | 8.3664E-02 | -2.2831E-01 | 4.7984E-01 | -7.0174E-01 | 7.0011E-01 |
| R3 | 1.4728E+01 | 1.6225E-02 | -1.9325E-01 | 4.1388E-01 | -5.9308E-01 | 5.6842E-01 |
| R4 | -2.6584E+01 | -1.4288E-02 | -5.1302E-02 | -3.6050E-02 | 1.4884E-01 | -2.5527E-01 |
| R5 | -9.9000E+01 | -2.6290E-02 | -2.9171E-02 | 3.3120E-02 | -4.0916E-02 | 3.7159E-02 |
| R6 | 9.1205E+00 | -3.0764E-02 | -3.0541E-02 | 3.2996E-02 | -3.3521E-02 | 2.7106E-02 |
| R7 | 1.1492E+01 | -4.7566E-02 | 1.3858E-02 | -2.1194E-02 | 3.4741E-02 | -3.8656E-02 |
| R8 | -9.8868E+01 | -5.4416E-02 | 2.2341E-02 | -1.3773E-02 | 4.1011E-03 | -8.0853E-04 |
| R9 | -5.4956E+01 | -1.7514E-02 | 1.3287E-02 | -2.3408E-02 | 1.9145E-02 | -1.0075E-02 |
| R10 | 2.0512E+01 | -3.5665E-02 | 6.9079E-02 | -9.0783E-02 | 6.1153E-02 | -2.2429E-02 |
| R11 | 2.7315E+01 | -6.4214E-02 | 4.7056E-02 | -6.4369E-02 | 3.3433E-02 | -4.3402E-03 |
| R12 | -5.9336E+01 | -2.9232E-02 | 4.3888E-03 | -1.6416E-02 | 1.1128E-02 | -3.4061E-03 |
| R13 | -5.4477E+00 | -2.3520E-02 | 2.7984E-03 | -1.6397E-03 | 5.2120E-04 | -4.2005E-05 |
| R14 | -2.5670E+00 | -2.6295E-02 | -2.0074E-03 | 1.7681E-03 | -2.8776E-04 | 2.3378E-05 |
| R15 | -2.8686E+00 | -5.2859E-02 | 1.3625E-02 | -1.8754E-03 | 4.2425E-05 | 2.7270E-05 |
| R16 | -5.0468E+00 | 6.5092E-02 | -4.9769E-02 | 1.5666E-02 | -2.8387E-03 | 3.2230E-04 |
| R17 | -4.5880E+00 | 1.1141E-01 | -6.9607E-02 | 1.9901E-02 | -3.3742E-03 | 3.6010E-04 |
| R18 | -8.7023E-01 | -4.3072E-02 | 3.2059E-03 | 1.7311E-04 | -9.0197E-05 | 1.1229E-05 |

| | Conic coefficient | Aspherical coefficient | | | |
|---|---|---|---|---|---|
| | k | A14 | A16 | A18 | A20 |
| R1 | 4.5153E+01 | 2.1212E-02 | -1.0902E-02 | 2.9664E-03 | -3.2271E-04 |
| R2 | -9.9000E+01 | -4.6161E-01 | 1.9134E-01 | -4.4823E-01 | 4.5091E-03 |
| R3 | 1.4728E+01 | -3.4557E-01 | 1.2284E-01 | -2.1242E-02 | 9.2097E-04 |
| R4 | -2.6584E+01 | 2.6152E-01 | -1.5879E-01 | 5.2961E-02 | -7.4732E-03 |
| R5 | -9.9000E+01 | -1.6312E-02 | 2.9111E-03 | 0.0000E+00 | 0.0000E+00 |
| R6 | 9.1205E+00 | -1.1743E-02 | 1.9653E-03 | 0.0000E+00 | 0.0000E+00 |
| R7 | 1.1492E+01 | 2.7447E-02 | -1.1735E-02 | 2.4666E-03 | -1.5275E-04 |
| R8 | -9.8868E+01 | -2.3919E-05 | 3.6343E-05 | 0.0000E+00 | 0.0000E+00 |
| R9 | -5.4956E+01 | 2.7534E-03 | -2.8412E-04 | 0.0000E+00 | 0.0000E+00 |
| R10 | 2.0512E+01 | 4.0616E-03 | -2.7345E-04 | 0.0000E+00 | 0.0000E+00 |
| R11 | 2.7315E+01 | -2.1668E-03 | 8.1206E-04 | -7.9626E-05 | 5.9754E-07 |
| R12 | -5.9336E+01 | 5.2282E-04 | -3.1799E-05 | -5.7995E-07 | 1.0561E-07 |
| R13 | -5.4477E+00 | 0.0000E+00 | 0.0000E+00 | 0.0000E+00 | 0.0000E+00 |
| R14 | -2.5670E+00 | 0.0000E+00 | 0.0000E+00 | 0.0000E+00 | 0.0000E+00 |
| R15 | -2.8686E+00 | -4.6822E-06 | 3.5903E-07 | -1.3483E-08 | 1.9758E-10 |
| R16 | -5.0468E+00 | -2.3464E-05 | 1.0705E-06 | -2.7967E-08 | 3.1978E-10 |
| R17 | -4.5880E+00 | -2.4398E-05 | 1.0192E-06 | -2.3972E-08 | 2.4313E-10 |
| R18 | -8.7023E-01 | -7.2599E-07 | 2.6562E-08 | -5.2827E-10 | 4.5039E-12 |

Table 7 and Table 8 show design data of inflection points and arrest points of each lens in the camera optical lens 20 according to the second embodiment of the present invention.

TABLE 7

| | Number of reflection points | Reflection point position 1 | Reflection point position 2 | Reflection point position 3 |
|---|---|---|---|---|
| P1R1 | 0 | / | / | / |
| P1R2 | 1 | 0.195 | / | / |
| P2R1 | 0 | / | / | / |
| P2R2 | 0 | / | / | / |
| P3R1 | 2 | 0.135 | 1.155 | / |
| P3R2 | 0 | / | / | / |
| P4R1 | 1 | 1.415 | / | / |
| P4R2 | 1 | 0.305 | / | / |
| P5R1 | 3 | 0.645 | 1.635 | 1.755 |
| P5R2 | 1 | 1.705 | / | / |
| P6R1 | 2 | 0.295 | 1.705 | / |
| P6R2 | 2 | 0.365 | 1.855 | / |
| P7R1 | 1 | 1.815 | / | / |
| P7R2 | 1 | 1.855 | / | / |
| P8R1 | 2 | 0.915 | 3.235 | / |
| P8R2 | 1 | 1.085 | / | / |
| P9R1 | 3 | 1.235 | 3.075 | 3.785 |
| P9R2 | 1 | 1.365 | / | / |

TABLE 8

| | Number of arrest points | Arrest point position 1 | Arrest point position 2 | Arrest point position 3 |
|---|---|---|---|---|
| P1R1 | 0 | / | / | / |
| P1R2 | 1 | 0.385 | / | / |
| P2R1 | 0 | / | / | / |
| P2R2 | 0 | / | / | / |
| P3R1 | 1 | 0.215 | / | / |
| P3R2 | 0 | / | / | / |
| P4R1 | 0 | / | / | / |
| P4R2 | 1 | 0.545 | / | / |
| P5R1 | 1 | 1.035 | / | / |
| P5R2 | 0 | / | / | / |
| P6R1 | 1 | 0.525 | / | / |
| P6R2 | 1 | 0.615 | / | / |
| P7R1 | 0 | / | / | / |
| P7R2 | 0 | / | / | / |
| P8R1 | 1 | 2.255 | / | / |
| P8R2 | 1 | 2.745 | / | / |
| P9R1 | 3 | 2.635 | 3.615 | 3.915 |
| P9R2 | 1 | 3.145 | / | / |

Figure 6:
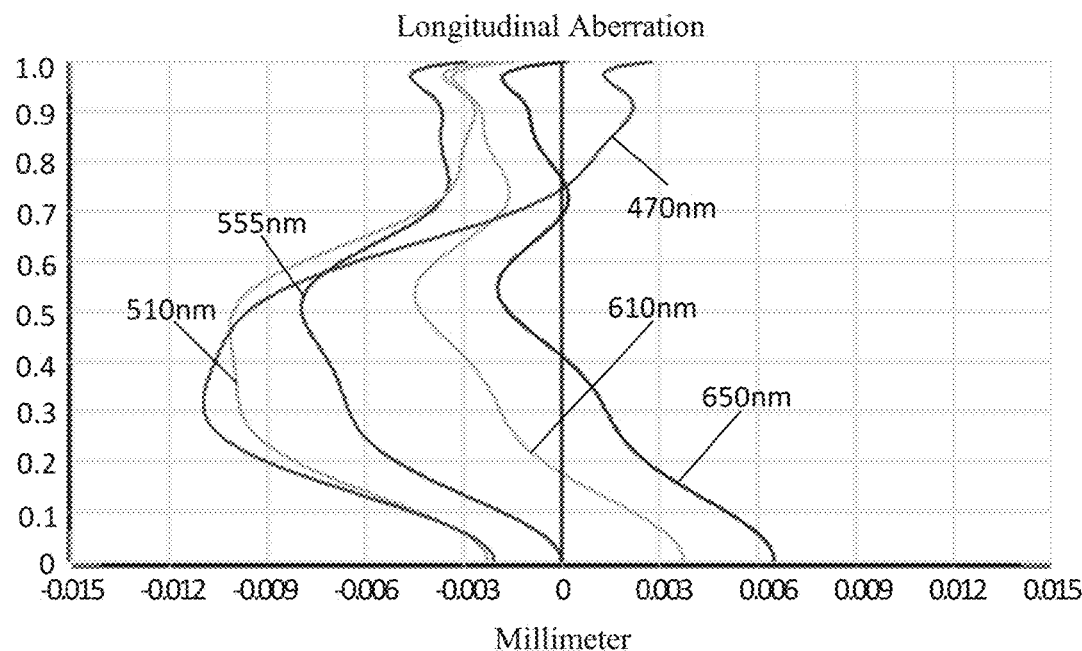
FIG. 6 is a schematic diagram of longitudinal aberration of the camera optical lens shown in FIG. 5.
Figure 7:
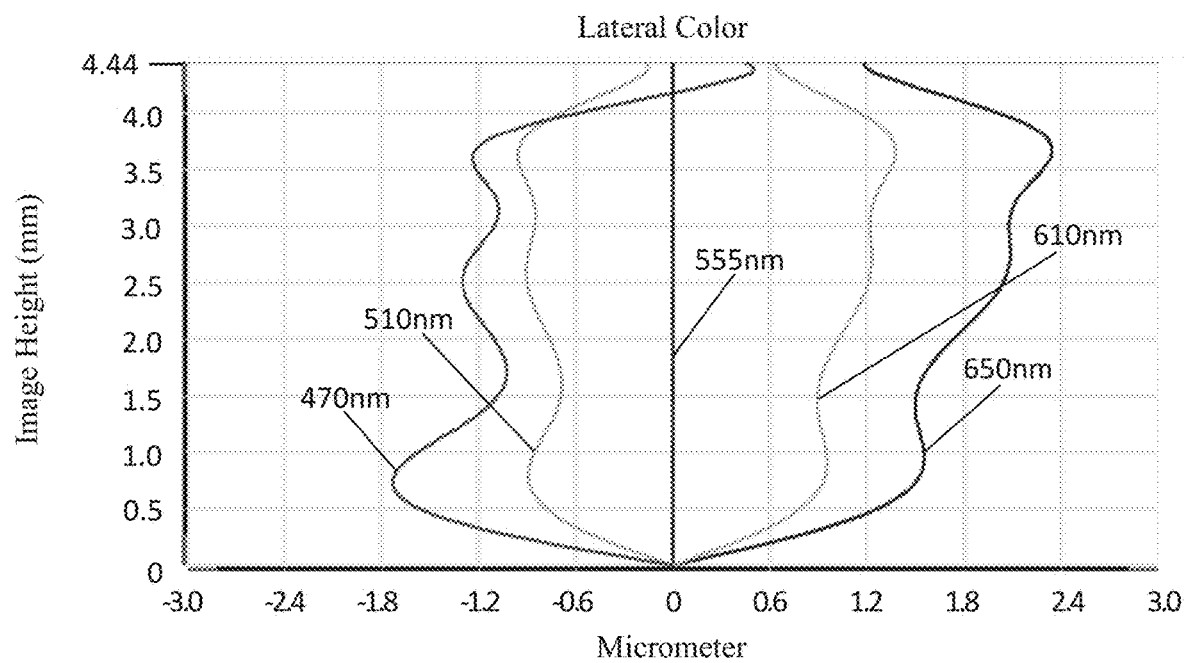
FIG. 7 is a schematic diagram of lateral color of the camera optical lens shown in FIG. 5.
Figure 8:
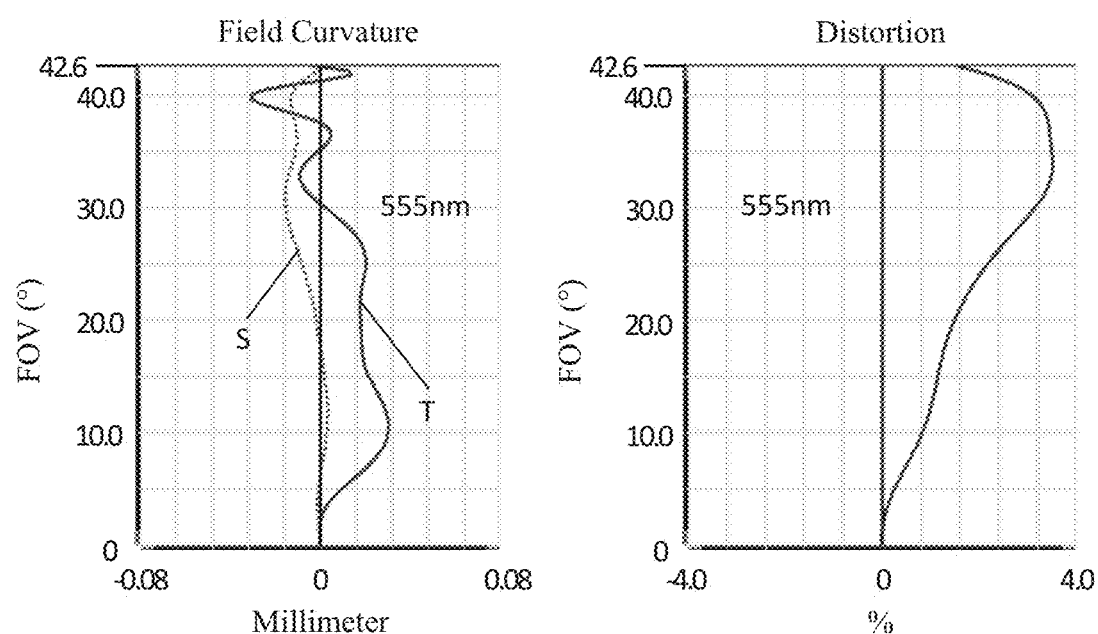
FIG. 8 is a schematic diagram of field curvature and distortion of the camera optical lens shown in FIG. 5.
Figure 9:
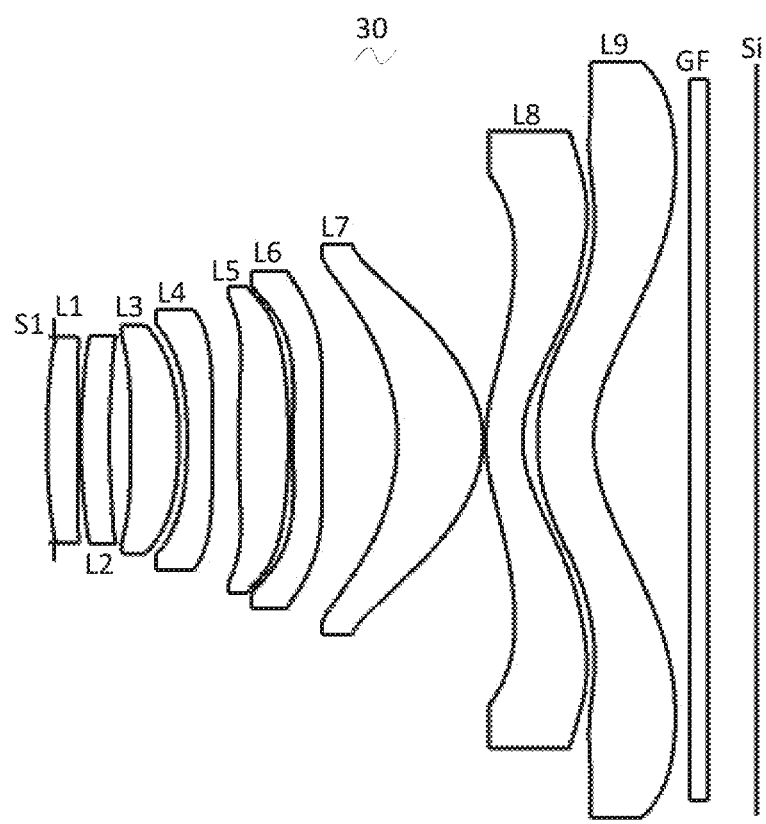
FIG. 9 is a schematic structural diagram of a camera optical lens according to a third embodiment of the present invention.

FIG. 6 and FIG. 7 respectively show schematic diagrams of longitudinal aberration and lateral color after light with wavelengths of 650 nm, 610 nm, 555 nm, 510 nm, and 470 nm passes through the camera optical lens 20 in the second embodiment. FIG. 8 shows a schematic diagram of field curvature and distortion after light with a wavelength of 555 nm passes through the camera optical lens 20 in the second embodiment.

As shown in Table 13, the second embodiment satisfies each condition.

In this embodiment, the camera optical lens 20 has an entrance pupil diameter ENPD of 2.439 mm, a full field-of-view image height IH of 4.443 mm, and a diagonal field-of-view angle FOV of 85.20°, so that the camera optical lens 20 meets design requirements of a large aperture, a wide angle, and ultra-thinness, has fully corrected on-axis and off-axis chromatic aberration, and has excellent optical characteristics.

Third Embodiment

The third embodiment is basically the same as the first embodiment. The meanings of the symbols are the same as those in the first embodiment. Only a difference thereof is described in the following.

In this embodiment, the sixth lens L6 has positive refractive power.

Table 9 and Table 10 show design data of the camera optical lens 30 according to the third embodiment of the present invention.

TABLE 9

|  | R | d |  | nd |  | vd |
|---|---|---|---|---|---|---|
| S1 | ∞ | d0= | −0.082 |  |  |  |
| R1 | 11.645 | d1= | 0.353 | nd1 | 1.5444 | v1 | 55.82 |
| R2 | −19.893 | d2= | 0.030 |  |  |  |
| R3 | 6.062 | d3= | 0.328 | nd2 | 1.6700 | v2 | 19.39 |
| R4 | 6.662 | d4= | 0.253 |  |  |  |
| R5 | −28.742 | d5= | 0.551 | nd3 | 1.5346 | v3 | 55.69 |
| R6 | −5.108 | d6= | 0.097 |  |  |  |
| R7 | −5.606 | d7= | 0.290 | nd4 | 1.6610 | v4 | 20.53 |
| R8 | 25.686 | d8= | 0.304 |  |  |  |
| R9 | 10.779 | d9= | 0.576 | nd5 | 1.5444 | v5 | 55.82 |
| R10 | −9.433 | d10= | 0.050 |  |  |  |
| R11 | 16.283 | d11= | 0.330 | nd6 | 1.6610 | v6 | 20.53 |
| R12 | 19.130 | d12= | 0.874 |  |  |  |
| R13 | −2.403 | d13= | 0.990 | nd7 | 1.5346 | v7 | 55.69 |
| R14 | −1.261 | d14= | 0.033 |  |  |  |
| R15 | 2.196 | d15= | 0.425 | nd8 | 1.5661 | v8 | 37.71 |
| R16 | 1.470 | d16= | 0.167 |  |  |  |
| R17 | 3.193 | d17= | 0.650 | nd9 | 1.5444 | v9 | 55.82 |
| R18 | 1.795 | d18= | 1.100 |  |  |  |
| R19 | ∞ | d19= | 0.210 | ndg | 1.5168 | vg | 64.17 |
| R20 | ∞ | d20= | 0.571 |  |  |  |

Table 10 shows aspherical data of each lens in the camera optical lens 30 according to the third embodiment of the present invention.

TABLE 10

| | Conic coefficient | Aspherical coefficient | | | | |
|---|---|---|---|---|---|---|
| | k | A4 | A6 | A8 | A10 | A12 |
| R1 | 4.5518E+01 | 1.7870E−02 | 3.0125E−04 | −2.6184E−02 | 5.9799E−02 | −7.4823E−02 |
| R2 | −9.9000E+01 | 8.1912E−02 | −2.2315E−01 | 5.1053E−01 | −8.4213E−01 | 9.8274E−01 |
| R3 | 1.6576E+01 | 1.4421E−02 | −1.8059E−01 | 4.2304E−01 | −6.7978E−01 | 7.6998E−01 |
| R4 | −3.8629E+01 | −2.1337E−02 | −4.9587E−03 | 1.8789E−03 | 2.2952E−02 | −2.5787E−02 |
| R5 | 5.6561E+01 | −2.7817E−02 | −1.4289E−02 | −8.3225E−03 | 3.8351E−02 | −5.1159E−02 |
| R6 | 9.4769E+00 | −2.8017E−02 | −4.6433E−02 | 6.6127E−02 | −6.4182E−02 | 3.6161E−02 |
| R7 | 1.1463E+01 | −4.3176E−02 | −1.7446E−02 | 7.2456E−02 | −1.1774E−01 | 1.2289E−01 |
| R8 | −9.7539E+01 | −5.6969E−02 | 2.3877E−02 | −7.4081E−03 | −5.9182E−03 | 5.1992E−03 |
| R9 | −6.9690E+01 | −2.0456E−02 | 1.9610E−02 | −2.9763E−02 | 2.1939E−02 | −1.0381E−02 |
| R10 | 2.0401E+01 | −3.2396E−02 | 5.0910E−02 | −5.7039E−02 | 3.1486E−02 | −8.9421E−03 |
| R11 | 2.5454E+01 | −5.6317E−02 | 1.9722E−02 | −3.2169E−02 | 1.8885E−02 | −6.5747E−03 |
| R12 | −2.0040E+01 | −2.2334E−02 | −1.1855E−02 | 2.7818E−03 | −1.6608E−03 | 1.9721E−03 |
| R13 | −5.8951E+00 | −2.6956E−02 | 6.5249E−03 | −2.5857E−03 | 5.5471E−04 | −3.3745E−05 |
| R14 | −2.5938E+00 | −3.1010E−02 | 2.3059E−03 | 9.9627E−05 | −1.1317E−05 | 8.2321E−06 |
| R15 | −2.9108E+00 | −5.4064E−02 | 1.5445E−02 | −3.6133E−03 | 7.3986E−04 | −1.2135E−04 |
| R16 | −4.8803E+00 | 6.9406E−02 | −5.4209E−02 | 1.7107E−02 | −3.0601E−03 | 3.3865E−04 |
| R17 | −4.4714E+00 | 1.1609E−01 | −7.3589E−02 | 2.1229E−02 | −3.6224E−03 | 3.8865E−04 |
| R18 | −8.6872E−01 | −3.7391E−02 | 2.3265E−04 | 1.0348E−03 | −2.5039E−04 | 3.0402E−05 |

| | Conic coefficient | Aspherical coefficient | | | |
|---|---|---|---|---|---|
| | k | A14 | A16 | A18 | A20 |
| R1 | 4.5518E+01 | 5.5318E−02 | −2.3782E−02 | 5.3614E−03 | −4.6308E−04 |
| R2 | −9.9000E+01 | −7.8993E−01 | 4.1484E−01 | −1.2740E−01 | 1.7268E−02 |
| R3 | 1.6576E+01 | −6.0180E−01 | 3.1021E−01 | −9.4353E−02 | 1.2683E−02 |
| R4 | −3.8629E+01 | 3.8015E−03 | 1.3520E−02 | −8.7642E−03 | 1.5859E−03 |
| R5 | 5.6561E+01 | 3.2086E−02 | −7.1258E−03 | 0.0000E+00 | 0.0000E+00 |
| R6 | 9.4769E+00 | −9.2939E−03 | 6.4300E−04 | 0.0000E+00 | 0.0000E+00 |
| R7 | 1.1463E+01 | −9.3189E−02 | 4.9664E−02 | −1.6029E−02 | 2.2569E−03 |
| R8 | −9.7539E+01 | −1.6948E−03 | 2.1388E−04 | 0.0000E+00 | 0.0000E+00 |
| R9 | −6.9690E+01 | 2.6336E−03 | −2.5758E−04 | 0.0000E+00 | 0.0000E+00 |
| R10 | 2.0401E+01 | 1.0069E−03 | −1.2001E−06 | 0.0000E+00 | 0.0000E+00 |
| R11 | 2.5454E+01 | 2.8729E−03 | −1.2689E−03 | 2.9383E−04 | −2.4795E−05 |
| R12 | −2.0040E+01 | −9.6966E−04 | 2.3631E−04 | −2.8967E−05 | 1.4542E−06 |
| R13 | −5.8951E+00 | 0.0000E+00 | 0.0000E+00 | 0.0000E+00 | 0.0000E+00 |
| R14 | −2.5938E+00 | 0.0000E+00 | 0.0000E+00 | 0.0000E+00 | 0.0000E+00 |
| R15 | −2.9108E+00 | 1.3622E−05 | −9.5438E−07 | 3.7713E−08 | −6.4338E−10 |
| R16 | −4.8803E+00 | −2.3845E−05 | 1.0509E−06 | −2.6680E−08 | 2.9975E−10 |
| R17 | −4.4714E+00 | −2.6468E−05 | 1.1117E−06 | −2.6305E−08 | 2.6858E−10 |
| R18 | −8.6872E−01 | −2.1572E−06 | 9.0268E−08 | −2.0683E−09 | 2.0025E−11 |

Table 11 and Table 12 show design data of inflection points and arrest points of each lens in the camera optical lens 30 according to the third embodiment of the present invention.

TABLE 11

| | Number of reflection points | Reflection point position 1 | Reflection point position 2 | Reflection point position 3 |
|---|---|---|---|---|
| P1R1 | 0 | / | / | / |
| P1R2 | 1 | 0.295 | / | / |
| P2R1 | 0 | / | / | / |
| P2R2 | 2 | 0.645 | 0.835 | / |
| P3R1 | 1 | 1.145 | / | / |
| P3R2 | 0 | / | / | / |
| P4R1 | 0 | / | / | / |
| P4R2 | 1 | 0.245 | / | / |
| P5R1 | 2 | 0.625 | 1.625 | / |
| P5R2 | 1 | 1.705 | / | / |
| P6R1 | 2 | 0.315 | 1.705 | / |
| P6R2 | 2 | 0.405 | 1.855 | / |
| P7R1 | 1 | 1.825 | / | / |
| P7R2 | 1 | 1.845 | / | / |
| P8R1 | 2 | 0.895 | 3.175 | / |
| P8R2 | 1 | 1.065 | / | / |
| P9R1 | 3 | 1.225 | 3.045 | 3.805 |
| P9R2 | 1 | 1.355 | / | / |

TABLE 12

| | Number of arrest points | Arrest point position 1 | Arrest point position 2 | Arrest point position 3 |
|---|---|---|---|---|
| P1R1 | 0 | / | / | / |
| P1R2 | 1 | 0.635 | / | / |
| P2R1 | 0 | / | / | / |
| P2R2 | 0 | / | / | / |
| P3R1 | 0 | / | / | / |
| P3R2 | 0 | / | / | / |
| P4R1 | 0 | / | / | / |
| P4R2 | 1 | 0.435 | / | / |
| P5R1 | 1 | 0.995 | / | / |
| P5R2 | 0 | / | / | / |
| P6R1 | 1 | 0.545 | / | / |
| P6R2 | 1 | 0.665 | / | / |
| P7R1 | 0 | / | / | / |
| P7R2 | 0 | / | / | / |
| P8R1 | 1 | 2.165 | / | / |
| P8R2 | 1 | 2.675 | / | / |
| P9R1 | 3 | 2.595 | 3.495 | 4.005 |
| P9R2 | 1 | 3.275 | / | / |

Figure 10:
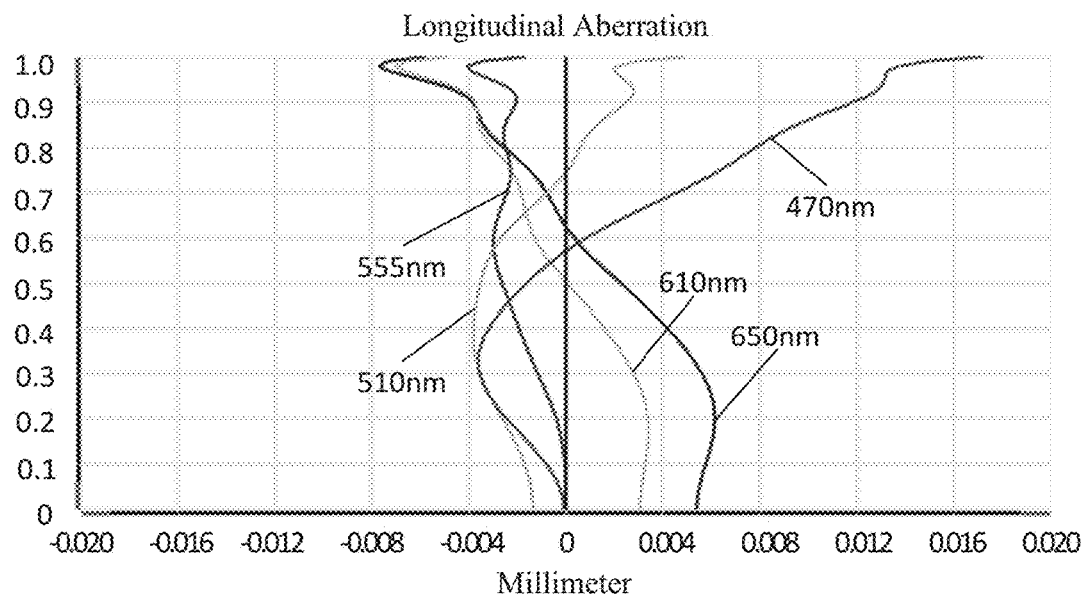
FIG. 10 is a schematic diagram of longitudinal aberration of the camera optical lens shown in FIG. 9.
Figure 11:
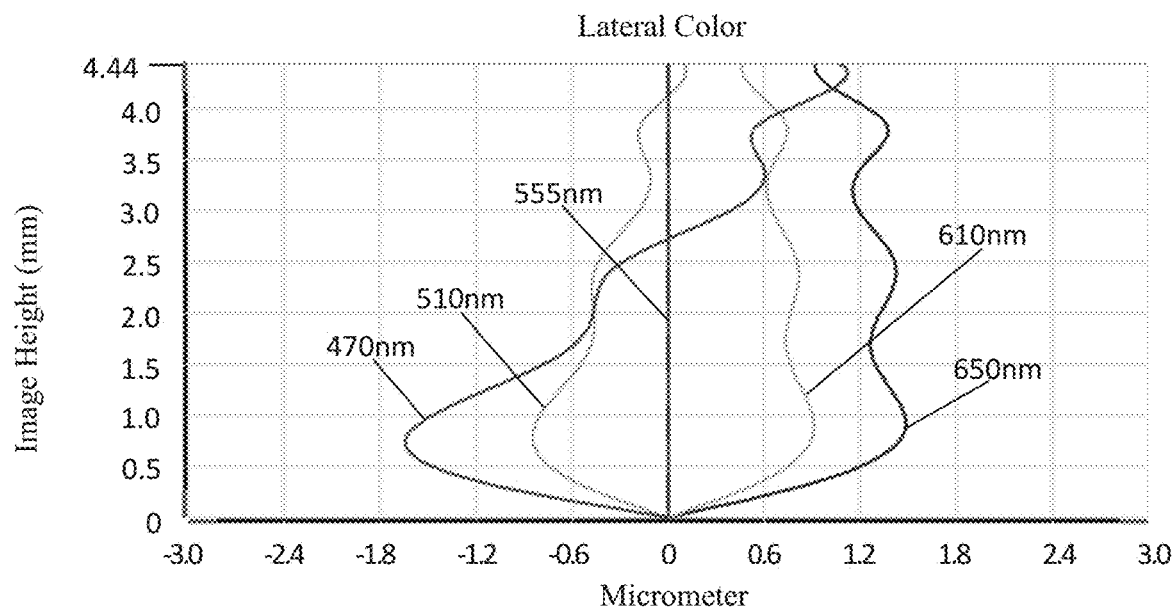
FIG. 11 is a schematic diagram of lateral color of the camera optical lens shown in FIG. 9.
Figure 12:
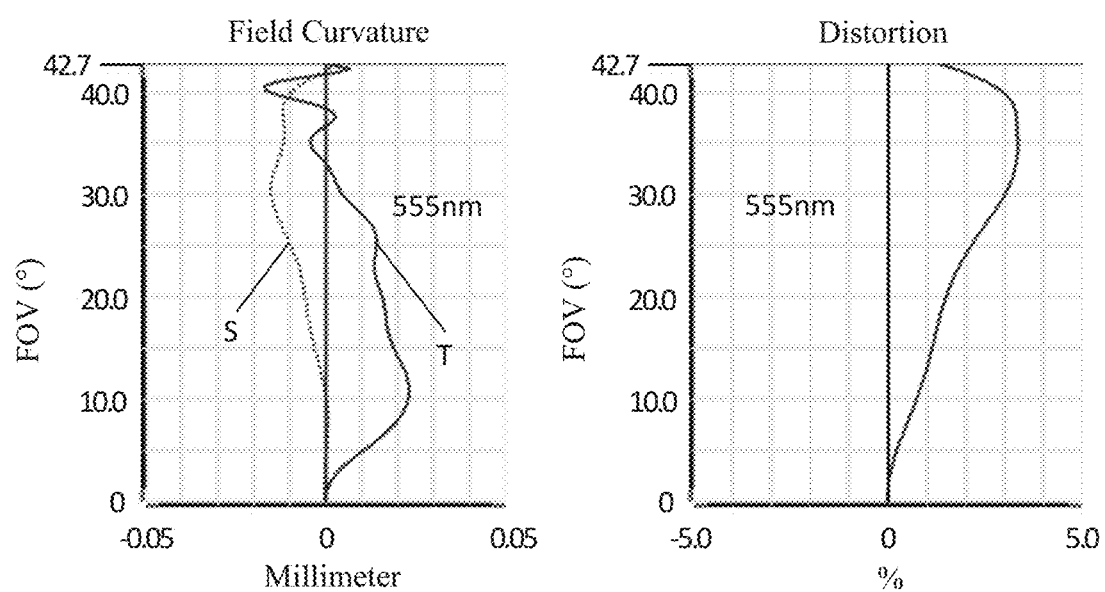
FIG. 12 is a schematic diagram of field curvature and distortion of the camera optical lens shown in FIG. 9.

FIG. 10 and FIG. 11 respectively show schematic diagrams of longitudinal aberration and lateral color after light with wavelengths of 650 nm, 610 nm, 555 nm, 510 nm, and 470 nm passes through the camera optical lens 30 in the third embodiment. FIG. 12 shows a schematic diagram of field curvature and distortion after light with a wavelength of 555 nm passes through the camera optical lens 30 in the third embodiment.

Table 13 below lists values corresponding to the conditions in this embodiment according to the above conditions. Apparently, the camera optical lens in this embodiment satisfies the above-mentioned condition.

In this embodiment, the camera optical lens 30 has an entrance pupil diameter ENPD of 2.438 mm, a full field-of-view image height IH of 4.443 mm, and a diagonal field-of-view angle FOV of 85.40°, so that the camera optical lens 30 meets design requirements of a large aperture, a wide angle, and ultra-thinness, has fully corrected on-axis and off-axis chromatic aberration, and has excellent optical characteristics.

TABLE 13

| Parameters and conditions | Embodiment 1 | Embodiment 2 | Embodiment 3 |
|---|---|---|---|
| f1/f | 2.05 | 3.36 | 2.84 |
| d5/d6 | 8.96 | 2.50 | 5.68 |
| f8/f7 | −11.02 | −2.59 | −2.62 |
| f | 4.683 | 4.755 | 4.754 |
| f1 | 9.599 | 15.990 | 13.502 |
| f2 | 56.980 | 196.181 | 81.527 |
| f3 | 18.609 | 11.311 | 11.488 |
| f4 | −7.488 | −7.443 | −6.877 |
| f5 | 10.397 | 8.825 | 9.304 |
| f6 | −654.391 | 148.930 | 156.810 |
| f7 | 3.987 | 3.719 | 3.795 |
| f8 | −43.944 | −9.634 | −9.924 |
| f9 | −4.857 | −8.976 | −8.979 |
| f12 | 8.125 | 14.498 | 11.410 |
| FNO | 1.95 | 1.95 | 1.95 |
| TTL | 7.775 | 8.240 | 8.182 |
| IH | 4.443 | 4.443 | 4.443 |
| FOV | 85.80° | 85.20° | 85.40° |

It should be understood by those skilled in the art that the above embodiments are merely some specific embodiments of the present invention, and various changes in form and details may be made without departing from the scope of the present invention.

What is claimed is:

1. A camera optical lens, comprising from an object side to an image side:
a first lens having positive refractive power;
a second lens having positive refractive power;
a third lens having positive refractive power;
a fourth lens having negative refractive power;
a fifth lens having positive refractive power;
a sixth lens;
a seventh lens having positive refractive power;
an eighth lens having negative refractive power; and
a ninth lens having negative refractive power;
wherein the camera optical lens satisfies:

$$2.00 \leq f1/f \leq 3.50;$$

$$-0.98 \leq (R1+R2)/(R1-R2) \leq 0.71$$

$$0.02 \leq d1/TTL \leq 0.07; \text{ and}$$

$$2.00 \leq d5/d6 \leq 9.00,$$

where
f denotes a focal length of the camera optical lens,
f1 denotes a focal length of the first lens,
R1 denotes a central curvature radius of an object side surface of the first lens,
R2 denotes a central curvature radius of an image side surface of the first lens,
d1 denotes an on-axis thickness of the first lens,
TTL denotes a total optical length from the object side surface of the first lens to an image plane of the camera optical lens along an optic axis,
d5 denotes an on-axis thickness of the third lens, and
d6 denotes an on-axis distance from an image side surface of the third lens to an object side surface of the fourth lens.

2. The camera optical lens as described in claim 1, further satisfying:

$$-12.00 \leq f8/f7 \leq -2.50,$$

where f7 denotes a focal length of the seventh lens, and f8 denotes a focal length of the eighth lens.

3. The camera optical lens as described in claim 1, further satisfying:

$$6.08 \leq f2/f \leq 61.89;$$

$$-205.16 \leq (R3+R4)/(R3-R4) \leq -7.20; \text{ and}$$

$$0.02 \leq d3/TTL \leq 0.06,$$

where f2 denotes a focal length of the second lens,

R3 denotes a central curvature radius of an object side surface of the second lens, R4 denotes a central curvature radius of an image side surface of the second lens, d3 denotes an on-axis thickness of the second.

4. The camera optical lens as described in claim 1, further satisfying:

$$1.19 \leq f3/f \leq 5.96;$$

$$0.47 \leq (R5+R6)/(R5-R6) \leq 3.21; \text{ and}$$

$$0.03 \leq d5/TTL \leq 0.10,$$

where f3 denotes a focal length of the third lens,

R5 denotes a central curvature radius of an object side surface of the third lens, R6 denotes a central curvature radius of the image side surface of the third lens.

5. The camera optical lens as described in claim 1, further satisfying:

$$-3.20 \leq f4/f \leq -0.96;$$

$$-1.28 \leq (R7+R8)/(R7-R8) \leq 0.28; \text{ and}$$

$$0.02 \leq d7/TTL \leq 0.06,$$

where f4 denotes a focal length of the fourth lens,

R7 denotes a central curvature radius of the object side surface of the fourth lens, R8 denotes a central curvature radius of an image side surface of the fourth lens, d7 denotes an on-axis thickness of the fourth lens.

6. The camera optical lens as described in claim 1, further satisfying:

$$0.93 \leq f5/f \leq 3.33;$$

$$0.00 \leq (R9+R10)/(R9-R10) \leq 0.35; \text{ and}$$

$$0.04 \leq d9/TTL \leq 0.12,$$

where f5 denotes a focal length of the fifth lens,

R9 denotes a central curvature radius of an object side surface of the fifth lens, R10 denotes a central curvature radius of an image side surface of the fifth lens, d9 denotes an on-axis thickness of the fifth lens.

7. The camera optical lens as described in claim 1, further satisfying:

$$-279.48 \leq f6/f \leq 49.48;$$

$$-24.88 \leq (R11+R12)/(R11-R12) \leq 73.76; \text{ and}$$

$$0.02 \leq d11/TTL \leq 0.06,$$

where f6 denotes a focal length of the sixth lens,

R11 denotes a central curvature radius of an object side surface of the sixth lens, R12 denotes a central curvature radius of an image side surface of the sixth lens, d11 denotes an on-axis thickness of the sixth lens.

8. The camera optical lens as described in claim 1, further satisfying:

$$0.39 \leq f7/f \leq 1.28;$$

$$1.38 \leq (R13+R14)/(R13-R14) \leq 5.08; \text{ and}$$

$$0.05 \leq d13/TTL \leq 0.18,$$

where f7 denotes a focal length of the seventh lens,

R13 denotes a central curvature radius of an object side surface of the seventh lens, R14 denotes a central curvature radius of an image side surface of the seventh lens, d13 denotes an on-axis thickness of the seventh lens.

9. The camera optical lens as described in claim 1, further satisfying:

$$-18.77 \leq f8/f \leq -1.35;$$

$$2.49 \leq (R15+R16)/(R15-R16) \leq 18.86; \text{ and}$$

$$0.03 \leq d15/TTL \leq 0.08,$$

where f8 denotes a focal length of the eighth lens,

R15 denotes a central curvature radius of an object side surface of the eighth lens, R16 denotes a central curvature radius of an image side surface of the eighth lens, d15 denotes an on-axis thickness of the eighth lens.

10. The camera optical lens as described in claim 1, further satisfying:

$$-3.78 \leq f9/f \leq -0.69;$$

$$0.77 \leq (R17+R18)/(R17-R18) \leq 5.39; \text{ and}$$

$$0.04 \leq d17/TTL \leq 0.13,$$

where f9 denotes a focal length of the ninth lens,

R17 denotes a central curvature radius of an object side surface of the ninth lens, R18 denotes a central curvature radius of an image side surface of the ninth lens, d17 denotes an on-axis thickness of the ninth lens.

* * * * *